J. H. LUBBERS.
METHOD OF DRAWING GLASS ARTICLES.
APPLICATION FILED JAN. 10, 1906.

1,020,920.    Patented Mar. 19, 1912.

WITNESSES
R. A. Balderson.
Warren W. Swartz.

INVENTOR
John H. Lubbers
by Bakewell & Byrnes
his attys

UNITED STATES PATENT OFFICE.

JOHN H. LUBBERS, OF ALLEGHENY, PENNSYLVANIA, ASSIGNOR TO WINDOW GLASS MACHINE COMPANY, OF PITTSBURGH, PENNSYLVANIA, A CORPORATION OF NEW JERSEY.

METHOD OF DRAWING GLASS ARTICLES.

1,020,920.

Specification of Letters Patent. Patented Mar. 19, 1912.

Original application filed May 21, 1903, Serial No. 158,069. Divided and this application filed January 10, 1906. Serial No. 295,369.

*To all whom it may concern:*

Be it known that I, JOHN H. LUBBERS, a citizen of the United States, residing at Allegheny, Allegheny county, Pennsylvania, have invented a new and useful Method of Drawing Glass Articles, of which the following is a full, clear, and exact description, reference being had to the accompanying drawings, forming part of this specification, in which—

Figure 1:
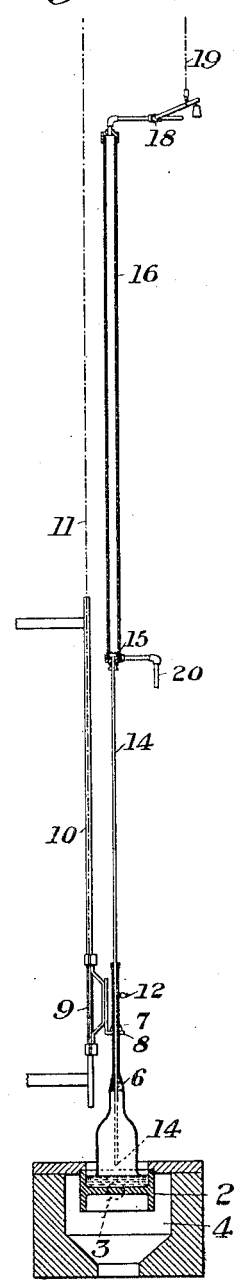
Figure 2:
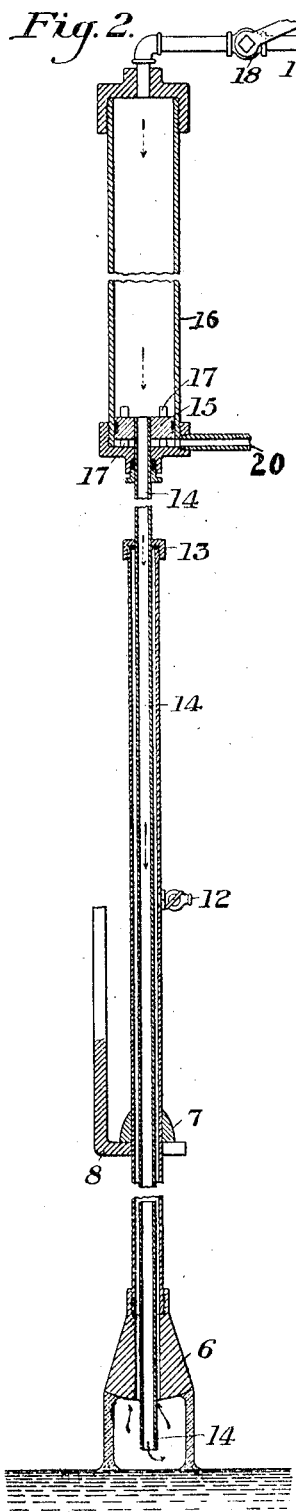
Figure 3:
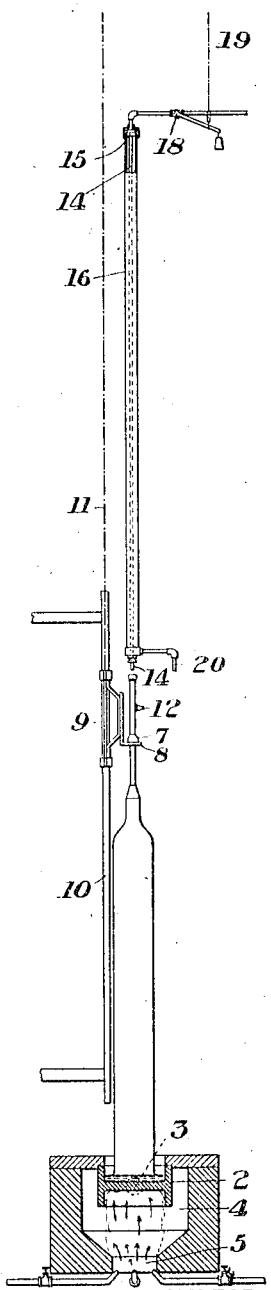

Figure 1 is a vertical section showing the drawing of a glass cylinder in accordance with my invention; Fig. 2 is an enlarged vertical section of the apparatus during the first portion of the drawing operation, and Fig. 3 is a view similar to Fig. 1, showing the withdrawal of the air supply pipe after the cylinder has been drawn to the desired length.

My invention relates to a novel method of drawing hollow glass articles, this application being a division of my application Serial No. 158,069, filed May 21st, 1903, and in accordance with which the interior of the hollow article is chilled at or near the drawing point, thereby enabling articles of thicker glass to be drawn than where outside chilling is used, and also equalizing the heat of the molten bath of glass which is more liable to chill in its outer portions. The inside chilling also enables the glass to be drawn at greater speed than formerly, and is of especial advantage where heat is applied to the bottom of the pot.

The invention provides for chilling the glass by air or gaseous fluid which is introduced through the bait, the air being supplied at the same level, or substantially the same level with respect to that of the glass bath, throughout the drawing operation. By thus applying the air its effect in chilling is substantially uniform throughout the drawing, and the chilling effect is much stronger than where the air is introduced through a central hole in the pot.

The invention is further designed to provide for withdrawing the hollow article and the supply tube from each other after the drawing operation is completed, this being preferably accomplished by drawing the supply tube upwardly out of the article after the drawing of the glass article is completed.

The invention also provides for the exhaust or relief of a small portion of the air supplied to the interior of the article during drawing, which may be done through a small hole which is opened by the operator after the forming of the cap; so that a constant opening is provided through which the excess air is passed out as it becomes heated within the article. This has been found desirable, especially in connection with a graduating valve by which the supply of the air is controlled, since the small outlet prevents the enlarging of the article during drawing, which is otherwise liable to occur on account of variations in pressure in the article.

In the accompanying drawing I have shown and described one form of apparatus suitable for carrying out my invention, which I will now describe, premising, however, that various other forms of apparatus may be employed.

In the drawings, 2 represents a double reversible pot into which the glass may be ladled or otherwise supplied; this pot being supported upon trunnions 3, within the upper portion of a furnace 4, to which heat is supplied through an eye 5. The pot is arranged to be raised and lowered and to be turned over so that after the drawing operation it may be reversed and the heat used to melt out the refuse glass. The pot may be either of double form with holding cavities in top and bottom, as shown, or of single form. This arrangement of pot and furnace is not claimed by me, it being the invention of Lincoln Thornburg.

I have shown the bait or drawing tool 6 as consisting of a blow-pipe of ordinary form, having a collar 7 which is hung on a hook 8 supported on the drawing-frame 9. The drawing frame is guided between vertical supports 10, 10, being lifted by a wire rope 11, or by other suitable mechanism.

At an intermediate point of the blow pipe is provided a pet cock 12 by which a small amount of the air may be allowed to pass out during the drawing and after the cap is formed. This pet cock is turned to open or partly open the hole, after the cap has been formed, it remaining open throughout the blowing operation. The blow pipe is provided with a stuffing-box 13 in its top through which extends the air supply-pipe 14, the lower end terminating near the level of the molten bath of glass in the pot. The upper end of this supply tube extends through and is secured to a piston 15 movable within a long cylinder or tube 16 supported in any suitable way, the piston having projections 17 on each face which prevent it from reaching the heads of the cylinder or tube. The stationary air-supply pipe 17' enters through the top head of the cylinder 16, this tube being provided with the usual graduating valve 18 having a connection 19 by which it is slowly turned during the drawing operation, as described in my previous Patents, 702,013 and 702,014 granted on June 10, 1902. A high pressure air supply tube 20 enters the lower end of the cylinder 16; this tube may be provided with a suitable hand controlled valve by which the operator may supply high pressure air to or exhaust it from the cylinder beneath the piston.

In carrying out the drawing operation the parts are in the position shown in Fig. 2, the operator supplying sufficient air through a hand valve at the working pulpit, and controlling the pipe 17', to form the neck and then swell out the article to form the cap of the desired size of the cylinder or article to be drawn. The pet cock on the blow pipe is then opened, and the drawing of the article begins; and as the article is drawn upwardly, air flows down through the upper cylinder and the supply pipe and emerges near the level of the molten glass and at the same level throughout the drawing operation. The supply of air during the drawing is regulated by the graduating valve to hold the article at the same size as it is being drawn, the regulation being assisted by allowing any excess air, which is expanded by the heat of the glass, to pass out through the small pet cock, thus preventing an enlarging of the cylinder. After the article is drawn to the desired length, high pressure air is admitted under the piston, and the supply-tube is thereby forced up and withdrawn from the article and the blow-pipe, the parts taking the position shown in Fig. 3. The blow-pipe is then lifted off the frame and lowered with the article to one side of the furnace.

The advantages of my invention result from supplying air through the hollow drawing tool, and at substantially the same level throughout the drawing operation. This tends to cool the central part of the molten bath, and renders the glass of more uniform consistency throughout the bath. It also produces a stronger chilling effect at or near the drawing point, enabling the drawing to be carried out more rapidly, or enabling a thicker article to be drawn, if desired. Another advantage of this method of supplying the air is that the cold air supplied near the level of the bath tends to force the heated air inside the article toward its upper portions, thus tending to anneal them and prevent rapid cooling of the upper parts which would give hard glass. This is of special advantage in drawing long cylinders, where the upper parts of the cylinder are lifted to a level far above the bath. The use of the cylinder and piston enables the supply tube to be quickly and easily withdrawn from the tool and the article, while the apparatus is simple and not expensive. The use of the hand controlled outlet between the graduating valve and the article is of advantage, as it provides a constant small outlet which is under the control of the operator, who can judge as to the proper area of outlet to give the desired result. After he has turned this outlet valve to open it to the desired extent, the air is then under the control of the graduating valve, which automatically varies the air supply as the drawing proceeds.

Many changes may be made in the form and arrangement of the drawing apparatus, the depending supply tube, the means for withdrawing the tube and article from each other, the hand controlled outlet, etc., without departing from my invention.

I claim:—

1. The method of drawing hollow glass articles, consisting in attaching a drawing device to a bath of molten glass, drawing a hollow article upwardly therefrom, and supplying air downwardly through the drawing device at substantially the same level relative to the bath during the drawing operation, substantially as described.

2. The method of drawing hollow glass articles, consisting in attaching a drawing device to a bath of molten glass, drawing a hollow article upwardly therefrom, supplying air through the drawing device at substantially the same level relative to the bath during the drawing operation, and continuously permitting the air to escape from within the article during the drawing thereof after the neck has been formed to regulate the air pressure therein; substantially as described.

3. The method of drawing hollow glass articles, consisting in forming a neck, then enlarging and drawing the article upwardly from a bath of molten glass, supplying air to the interior of the article and opening a small air outlet as the drawing of the article proceeds; substantially as described.

4. The method of forming glass articles consisting in drawing the hollow glass article upwardly from a bath of molten glass, supplying air to the same level within the article through the drawing operation, automatically regulating the air supply to hold the article of the desired diameter and permitting a part of the air to escape during drawing; substantially as described.

5. The method of drawing hollow glass articles, consisting in drawing the glass upwardly from a bath of molten glass and supplying air downwardly upon the surface of the bath within the article at the same level through the drawing operation, thus allowing the heated air to rise within the article and assist in annealing its upper portions; substantially as described.

6. The method of forming hollow glass articles, consisting in drawing a hollow article from a glass bath, supplying air to the interior of the article during the drawing operation, and continuously regulating the air pressure within the article to prevent variations thereof during drawing, substantially as described.

7. The method of forming hollow glass articles, consisting in drawing a hollow glass article from a bath of molten glass, supplying air thereto during the drawing operation, varying the air supply during the draw, and continuously regulating the air pressure within the article to prevent variations in pressure therein during said draw, substantially as described.

8. In the method of drawing hollow glass articles, the steps consisting of supplying air thereto during the drawing operation, allowing the escape of said air, and automatically regulating the pressure within the article being drawn; substantially as described.

In testimony whereof, I have hereunto set my hand.

JOHN H. LUBBERS.

Witnesses:
 GEO. B. BLEMING,
 JOHN MILLER.